United States Patent
Karlsson et al.

(10) Patent No.: US 11,086,782 B2
(45) Date of Patent: Aug. 10, 2021

(54) METHOD OF LOGGING PROCESS DATA IN A PLC CONTROLLED EQUIPMENT

(71) Applicant: TETRA LAVAL HOLDINGS & FINANCE S.A., Pully (CH)

(72) Inventors: Lukas Karlsson, Malmö (SE); Ashraf Zarur, Lund (SE)

(73) Assignee: TETRA LAVAL HOLDINGS & FINANCE S.A., Pully (CH)

( * ) Notice: Subject to any disclaimer, the term of this patent is extended or adjusted under 35 U.S.C. 154(b) by 83 days.

(21) Appl. No.: 16/621,029

(22) PCT Filed: Jun. 18, 2018

(86) PCT No.: PCT/EP2018/066132
§ 371 (c)(1),
(2) Date: Dec. 10, 2019

(87) PCT Pub. No.: WO2018/234246
PCT Pub. Date: Dec. 27, 2018

(65) Prior Publication Data
US 2020/0142380 A1 May 7, 2020

(30) Foreign Application Priority Data
Jun. 21, 2017 (EP) .................................. 17177238

(51) Int. Cl.
*G06F 17/00* (2019.01)
*G06F 12/0864* (2016.01)
(Continued)

(52) U.S. Cl.
CPC ....... *G06F 12/0864* (2013.01); *G05B 19/042* (2013.01); *G05B 19/058* (2013.01);
(Continued)

(58) Field of Classification Search
CPC ............. G06F 9/30014; G06F 12/0864; G06F 3/0653; G06F 2009/4557;
(Continued)

(56) References Cited

U.S. PATENT DOCUMENTS

2006/0047884 A1* 3/2006 Tran .................... G06F 12/0864
711/3
2007/0288718 A1* 12/2007 Cholleti .............. G06F 12/1009
711/170
(Continued)

FOREIGN PATENT DOCUMENTS

EP 0 617 347 9/1994

OTHER PUBLICATIONS

Extended Search Report; EP 17177238.7; dated Dec. 6, 2017; 7 pages.
(Continued)

*Primary Examiner* — Tuan A Vu
(74) *Attorney, Agent, or Firm* — Knobbe Martens Olson & Bear LLP (57) ABSTRACT

A method of logging process data in a PLC controlled equipment is disclosed. Sections of a PLC application code comprise tasks configured to execute program functions at specific execution rates. Each of the tasks comprise program functions having dedicated memory areas assigned as tags, and each data entry of the process data comprises a tag value and an associated process value. The method comprises receiving process data from the PLC application code, assigning process values to threads of a thread pool, and receiving, for each of the threads, in a respective data table associated with each of the threads, the tag- and process values of the received process data, and determining a hash code for each of the tags according to a hash function of the respective data table for arranging the tag values and the
(Continued)

associated process values in the respective data table according to said hash code.

20 Claims, 5 Drawing Sheets

(51) Int. Cl.
    *G05B 19/042*     (2006.01)
    *G05B 19/05*     (2006.01)
    *G06F 9/38*     (2018.01)
    *G06F 9/48*     (2006.01)
    *G06F 9/30*     (2018.01)
    *G06F 3/06*     (2006.01)
    *G06F 12/1009*     (2016.01)

(52) U.S. Cl.
    CPC ........ *G06F 3/0653* (2013.01); *G06F 9/30014* (2013.01); *G06F 9/3836* (2013.01); *G06F 9/48* (2013.01); *G05B 2219/14055* (2013.01); *G06F 12/1009* (2013.01)

(58) Field of Classification Search
    CPC ....... G06F 2009/45591; G06F 11/3419; G05B 19/058; G05B 9/5038
    See application file for complete search history.

(56) References Cited

U.S. PATENT DOCUMENTS

| | | | |
|---|---|---|---|
| 2008/0104375 A1* | 5/2008 | Hansen | G06F 9/30014 712/220 |
| 2013/0124575 A1 | 5/2013 | Plache et al. | |
| 2014/0207254 A1 | 7/2014 | Nishiyama et al. | |
| 2016/0070246 A1 | 3/2016 | Nakagawa et al. | |
| 2017/0308297 A1* | 10/2017 | Roberts | G06F 3/0653 |

OTHER PUBLICATIONS

Written Opinion and International Search Report; PCT/EP2018/066132; dated Sep. 14, 2018; 8 pages.

* cited by examiner

METHOD OF LOGGING PROCESS DATA IN A PLC CONTROLLED EQUIPMENT

TECHNICAL FIELD

The present invention generally relates to the field of logging process data. More particularly, the present invention relates to a method of logging process data in a PLC controlled equipment running PLC application code where sections of the PLC application code comprise tasks configured to execute program functions at specific execution rates, and a related computer program product and an apparatus configured to log such process data, such as in systems relating to filling machines or related systems for producing sealed packages.

BACKGROUND

To maintain or increase the performance of PLC controlled machines large amounts of process data needs to be logged. Logging and analysis of such process data is an integral part of the development process of PLC controlled machines, such as those employed in systems for filling and sealing packaging containers. The handling of process data is a key driver in the industrial digitalization and accordingly a cornerstone when the functionality and design complexity of such systems increase, along with the challenges to retrieve a complete process overview (the "machine-DNA" or "fingerprint"). However, problems with previous logging techniques impede the efforts in improving these systems based on the data generated by the machines. Typically, only a fraction of the data generated in complex system can be logged spending a feasible amount of resources on the logging solution. Various manual logging solutions exists, which however consume an unreasonable amount of resources while not being sufficiently efficient or manageable. Stand-alone solutions that needs to be implemented and customized to the particular applications can provide for a more automated logging process, but suffers from the complexity of such implementation and the associated amount of resources needed to retrieve all the available output data. The mentioned complexity may for example arise from the incompatibility with the existing infrastructure of the machine control, needing further resources for various customization operations. Further, in more complex systems executing a multitude of parallel functions in real-time, the mentioned stand-alone solutions have proven to generate a considerable amount of jitter in the recorded data.

Hence, an improved method of logging process data in a PLC controlled equipment running PLC application code would be advantageous and in particular allowing for avoiding more of the above-mentioned problems and compromises, including providing for logging and handling an increased amount of data from PLC controlled equipment over time in a faster, more stable and efficient process. Such improved method may allow for a more efficient commissioning, i.e. verification and validation of the system, to facilitated trouble shooting, work as an enabler for production traceability and product development via a more complete and comprehensive process overview.

SUMMARY

Accordingly, examples of the present invention preferably seek to mitigate, alleviate or eliminate one or more deficiencies, disadvantages or issues in the art, such as the above-identified, singly or in any combination by providing a device according to the appended patent claims.

According to a first aspect a method of logging process data in a PLC controlled equipment running PLC application code is provided. Sections of the PLC application code comprise tasks configured to execute program functions at specific execution rates, wherein a first task has an associated execution rate different from a second execution rate of a second task in the PLC application code. Each of the tasks comprise program functions having dedicated memory areas assigned as tags, and each data entry of the process data comprises a tag value and an associated process value assigned from the PLC application code. The method comprises receiving process data from the PLC application code, whereby process values associated with said first task are assigned to threads of a thread pool in parallel with the respective assigning of process values associated with said second task to threads of the thread pool. The method further comprising receiving, for each of the threads, in a respective data table associated with each of the threads, the tag- and process values of the received process data, and determining a hash code for each of the tags according to a hash function of the respective data table for arranging the tag values and the associated process values in the respective data table according to said hash code.

According to a second aspect a computer program product comprising instructions which, when the program is executed by a computer, cause the computer to carry out the steps of the method according to the first aspect.

According to a third aspect an apparatus configured to log process data in a PLC controlled equipment running PLC application code is provided. Sections of the PLC application code comprise tasks configured to execute program functions at specific execution rates, wherein a first task has an associated execution rate different from a second execution rate of a second task in the PLC application code. Each of the tasks comprise program functions having dedicated memory areas assigned as tags, and each data entry of the process data comprises a tag value and an associated process value assigned from the PLC application code. The apparatus comprises a first processing module configured to receive process data from the PLC application code, and a second processing module configured to assign process values associated with said first task to threads of a thread pool in parallel with the respective assigning of process values associated with the second task to threads of the thread pool. The second processing module is further configured to receive, for each of the threads, in a respective data table associated with each of the threads, the tag- and process values of the received process data, and to determine a hash code for each of the tag values according to a hash function of the respective data table to arrange the tag values and the associated process values in the respective data table according to the hash code.

Further examples of the invention are defined in the dependent claims, wherein features for the second and third aspects of the disclosure are as for the first aspect mutatis mutandis.

Some examples of the disclosure provide for an improved method of logging an increased amount of process data in complex PLC machine systems with a multitude of parallel executed functions.

Some examples of the disclosure provide for faster and more stable logging of process data in PLC systems.

Some examples of the disclosure provide for improved logging of process data in PLC systems executing a plurality of functions or tasks executed at different time-scales or domains requiring different logging speeds.

Some examples of the disclosure provide for obtaining a more comprehensive process understanding in a PLC machine system and improved abilities for machine development.

Some examples of the disclosure provide for reducing complexity in implementing logging of process data in a PLC system.

Some examples of the disclosure provide for implementing logging of process data with minimized impact on the functionality of the PLC system.

Some examples of the disclosure provide for implementing logging of process data with minimized infrastructural changes to existing PLC system.

Some examples of the disclosure provide for improved production traceability.

Some examples of the disclosure provide for improved and less time-consuming trouble-shooting procedures of a machine.

Some examples of the disclosure provide for a more efficient use of resources to identify erroneous behavior in a machine or developing improvements thereof.

Some examples of the disclosure provide for more efficient procedures of evaluating the quality of a machine.

It should be emphasized that the term "comprises/comprising" when used in this specification is taken to specify the presence of stated features, integers, steps or components but does not preclude the presence or addition of one or more other features, integers, steps, components or groups thereof.

BRIEF DESCRIPTION OF THE DRAWINGS

These and other aspects, features and advantages of which examples of the invention are capable of will be apparent and elucidated from the following description of examples of the present invention, reference being made to the accompanying drawings, in which.

DETAILED DESCRIPTION

Specific examples of the invention will now be described with reference to the accompanying drawings. This invention may, however, be embodied in many different forms and should not be construed as limited to the examples set forth herein; rather, these examples are provided so that this disclosure will be thorough and complete, and will fully convey the scope of the invention to those skilled in the art. The terminology used in the detailed description of the examples illustrated in the accompanying drawings is not intended to be limiting of the invention. In the drawings, like numbers refer to like elements.

Figure 4A:
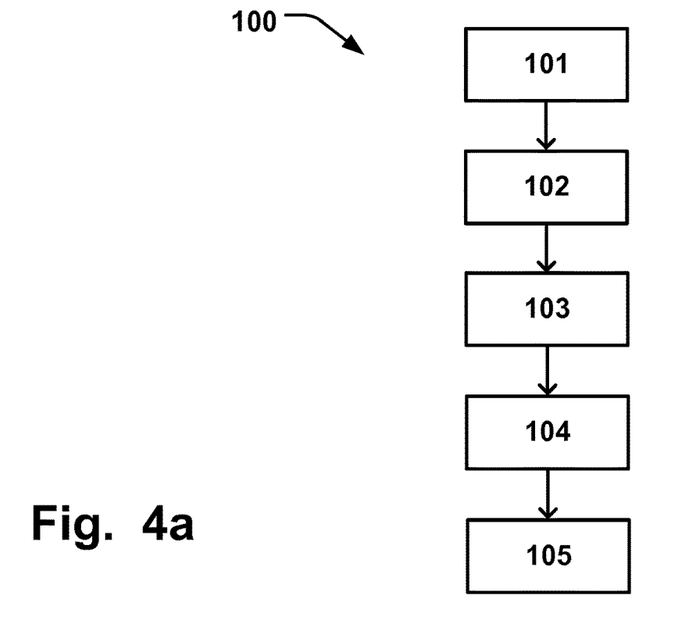
FIG. 4a is a flowchart of a method of logging process data in a PLC controlled equipment running PLC application code according to examples of the disclosure.

FIG. 4a illustrates a flow chart of a method 100 of logging process data in a PLC controlled equipment running PLC application code. The order in which the steps of the method 100 are described and illustrated should not be construed as limiting and it is conceivable that the steps can be performed in varying order. The method 100 is further illustrated in conjunction with the schematic diagram of FIG. 1 described in greater detail below.

Figure 1:
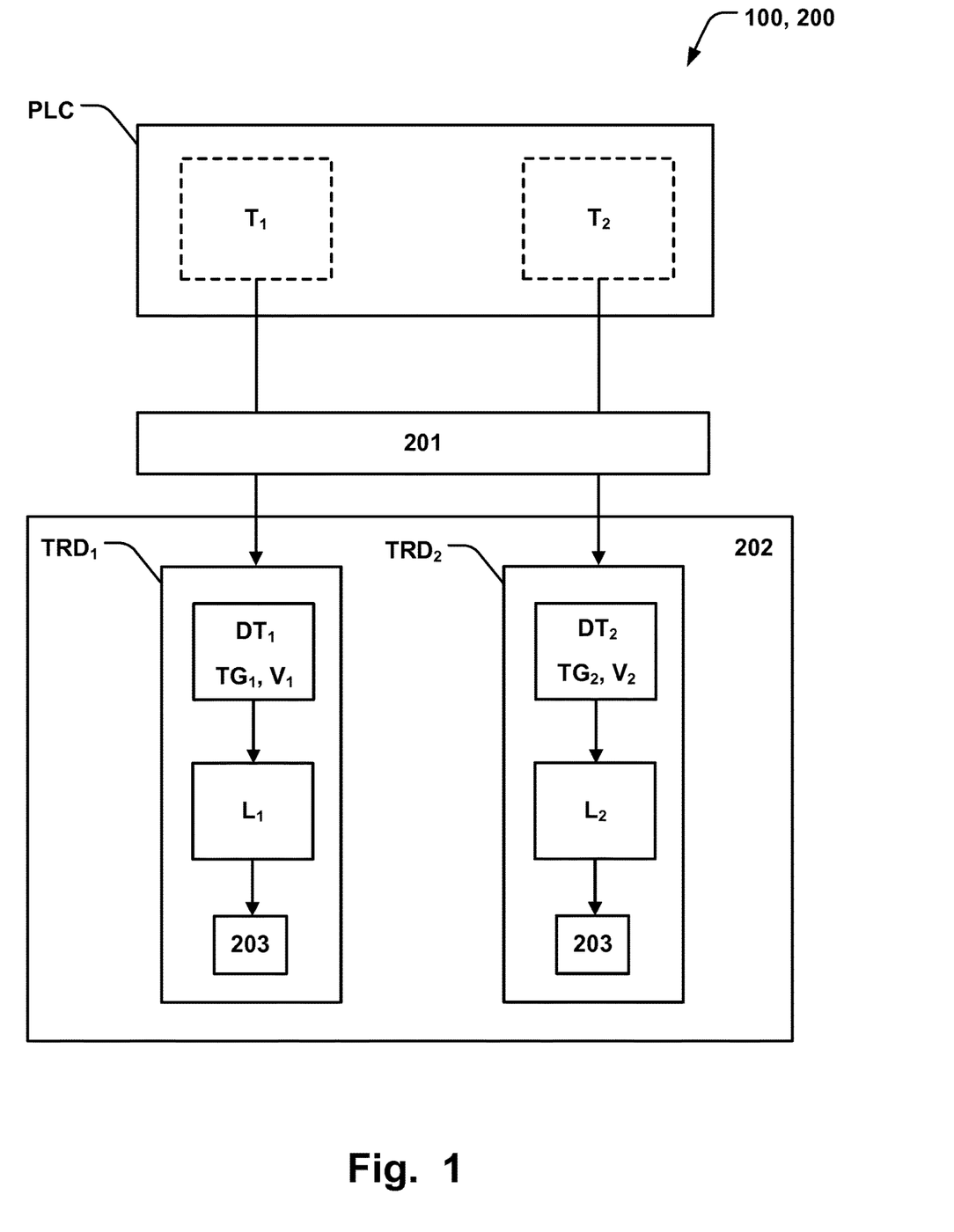
FIG. 1 is a schematic diagram illustrating a method and apparatus configured to log process data in a PLC controlled equipment running PLC application code according to examples of the disclosure.

A method 100 of logging process data in a PLC controlled equipment running PLC application code is thus provided. The PLC controlled equipment could be equipment of a system for filling and sealing packaging containers, and various machines related thereto. The PLC application code may be downloaded into the persistent memory of the equipment to perform the desired package equipment functionality. Sections of the PLC application code comprise tasks $T_1$, $T_2$, configured to execute program functions at specific execution rates. The PLC application may be divided into different task depending on which kind functionality is required. For example, some functionalities may be executed on a shorter time scale such as servo drives, hydraulics etc, than other functions less critical functions such as temperature control etc. A first task $T_1$ may thus have an associated execution rate different from a second execution rate of a second task $T_2$ in the PLC application code. Each of the tasks $T_1$, $T_2$, comprise program functions having dedicated memory areas assigned as "tags". Each data entry of the process data to be received from the PLC controlled equipment comprises a tag, i.e. a tag value $TG_1, \ldots TG_n$, corresponding to a given name of the data type, and an associated process value $V_1, \ldots V_n$, (could be various data types) being assigned from the PLC application code. The process value $V_1, \ldots V_n$, could originate from a sensor or other internal function etc. A machine such as a filling machine for packaging containers may for example require operate with thousands of tags. The method 100 comprises receiving 101 process data from the PLC application code. As described further below with respect to apparatus 100 configured to log process data in a PLC controlled equipment running PLC application code, the process data is retrieved by establishing connections with the PLC controlled equipment via a processing module 201 such as a communication module communicating with the PLC controlled equipment. The method 100 comprises assigning 102 process values associated with the first task $T_1$ to threads $TRD_1$ of a thread pool in parallel with the respective assigning of process values associated with said second task $T_2$ to threads $TRD_1$ of the thread pool. The method 100 and associated processing module 201 thus provide for the assigning of tasks $T_1$, $T_2$, configured to execute program functions at different execution rates, to the threads $TRD_1$, $TRD_2$, in parallel or simultaneously, independent of the different execution rates. Accordingly, it is possible to accommodate the various logging speed requirements for the different tasks. FIG. 1 illustrates an example where the first and second tasks $T_1$, $T_2$, are assigned to threads $TRD_1$, $TRD_2$, respectively as the processing module 201 establish connection with a PLC controlled equipment. Each "call back" of the processing module 201 to the PLC indicates that new process data has been received from the PLC, and that the process data is assigned to a thread. It is conceivable that the number of tasks and threads vary in any plurality.

Figure 2:
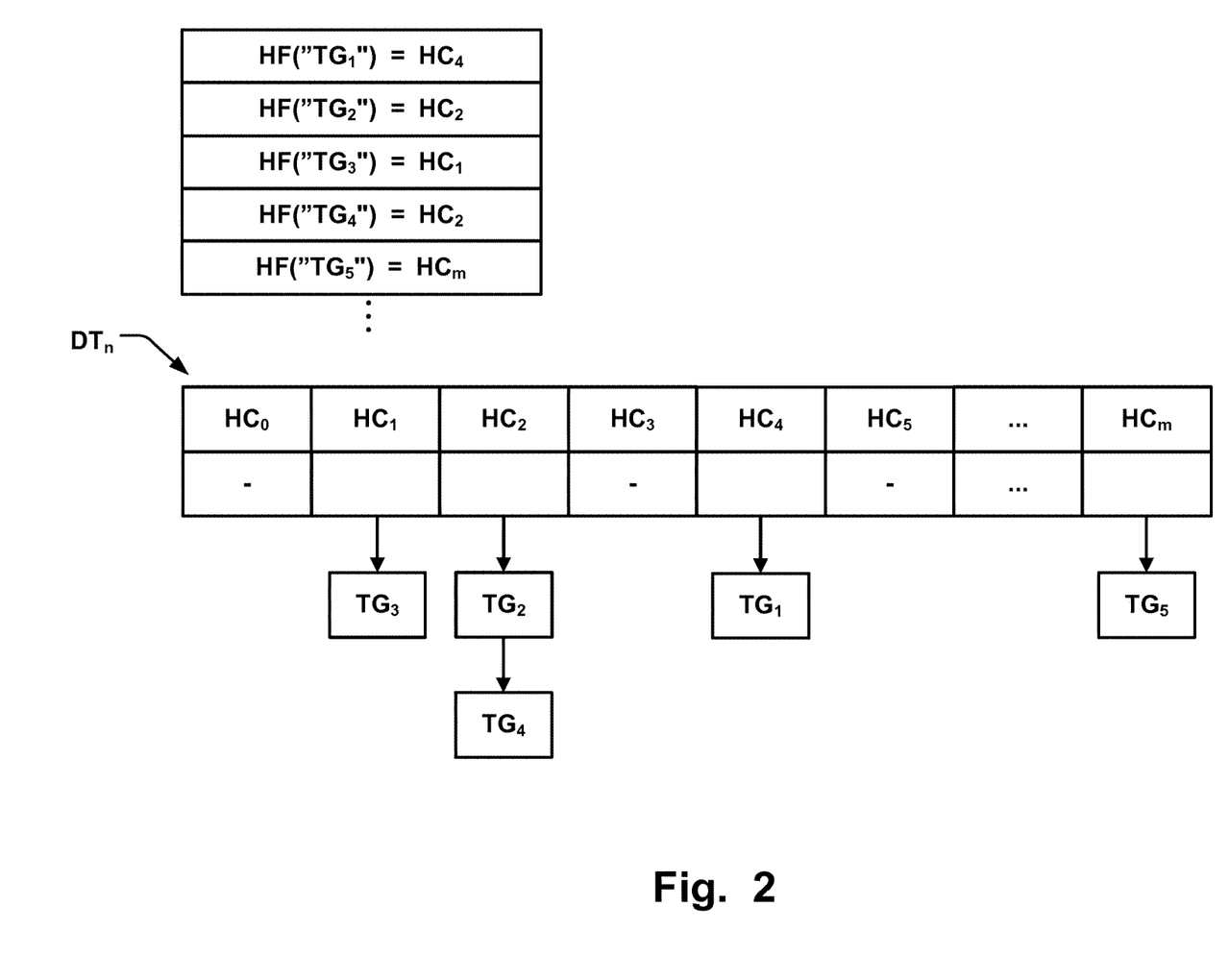
FIG. 2 is a schematic diagram illustrating determining hash codes of process tags and a related data table according to examples of the disclosure.

The method 100 comprises receiving 103, for each of the threads $TRD_1$, $TRD_2$, in a respective data table $DT_1$, $DT_2$, associated with each of the threads $TRD_1$, $TRD_2$, the tag- and process values $TG_n$, $V_n$, of the process data received from the PLC controlled equipment. The method 100 further comprises determining 104 a hash code $HC_m$, for each of the tags (i.e. for tag values $TG_n$ thereof) according to a hash function HF of the respective data table $DT_1$, $DT_2$, for arranging 105 the tag values $TG_n$ and the associated process values $V_n$ in the respective data table $DT_1$, $DT_2$ according to the mentioned hash code $HC_m$. This provides for an increased speed of receiving and arranging the process data in a manner so that logging of a multitude, e.g. thousands, of tags in various time domains including real-time can be realized in a PLC controlled equipment. Determining a hash code $HC_m$ for each of the tags according to a hash function HF of the respective data table $DT_1$, $DT_2$, allows for optimizing the structuring of the process data in the data tables $DT_1$, $DT_2$. Subsequent operations in the data tables $DT_1$, $DT_2$, such as search operations, can be executed at higher speed, allowing for example real-time condition-based logging as described further below. At the same time, versatility is increased without added complexity of the logging system since the data table allows for handling all generic types of process data. The hash function HF can be determined depending on the process data (e.g. the characteristics of the tags) communicated from the processing module 201 to the associated threads $TRD_1$, $TRD_2$, as described further below. FIG. 2 shows one example of a data table $DT_n$ where the tag values $TG_n$ and associated process values are arranged in the data table $DT_n$ according to the respective hash codes $HC_m$ determined by the hash function HF. In this example, tag values $TG_1$ to $TG_5$ and associated examples of hash codes $HC_m$ are shown. The data table structure further allows for a particularly advantageous application of logical operators, e.g. in an applied search condition to the process data, since such operators can be applied to a stack of data in the data table.

Figure 4B:
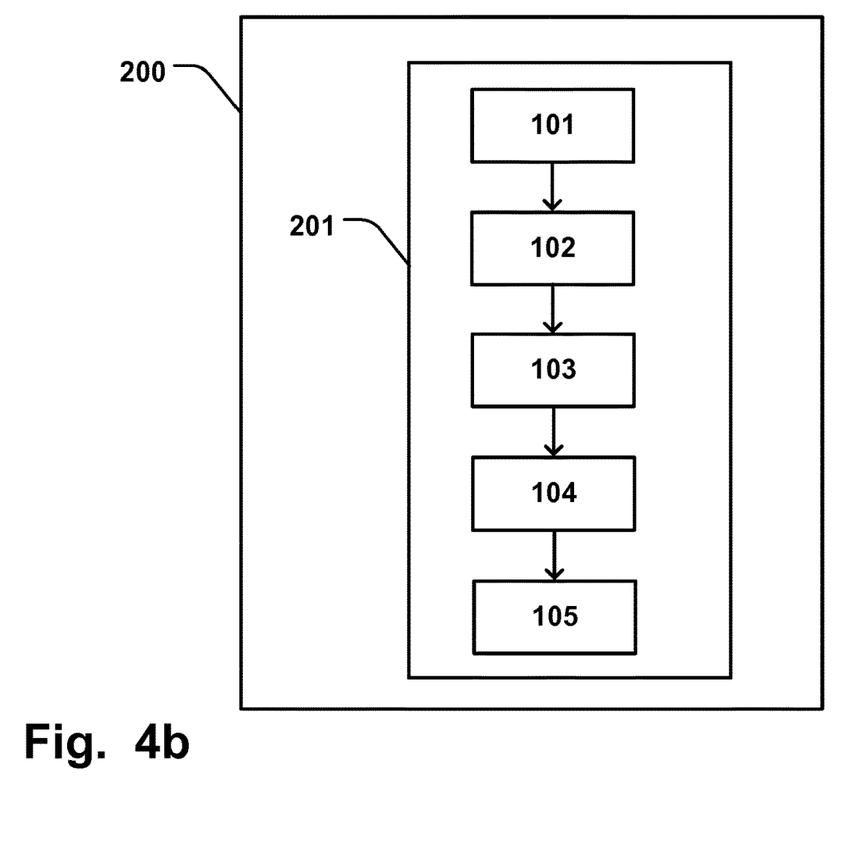
FIG. 4b is a schematic illustration of an apparatus configured to log process data in a PLC controlled equipment running PLC application code and an associated method according to examples of the disclosure.
Figure 5:
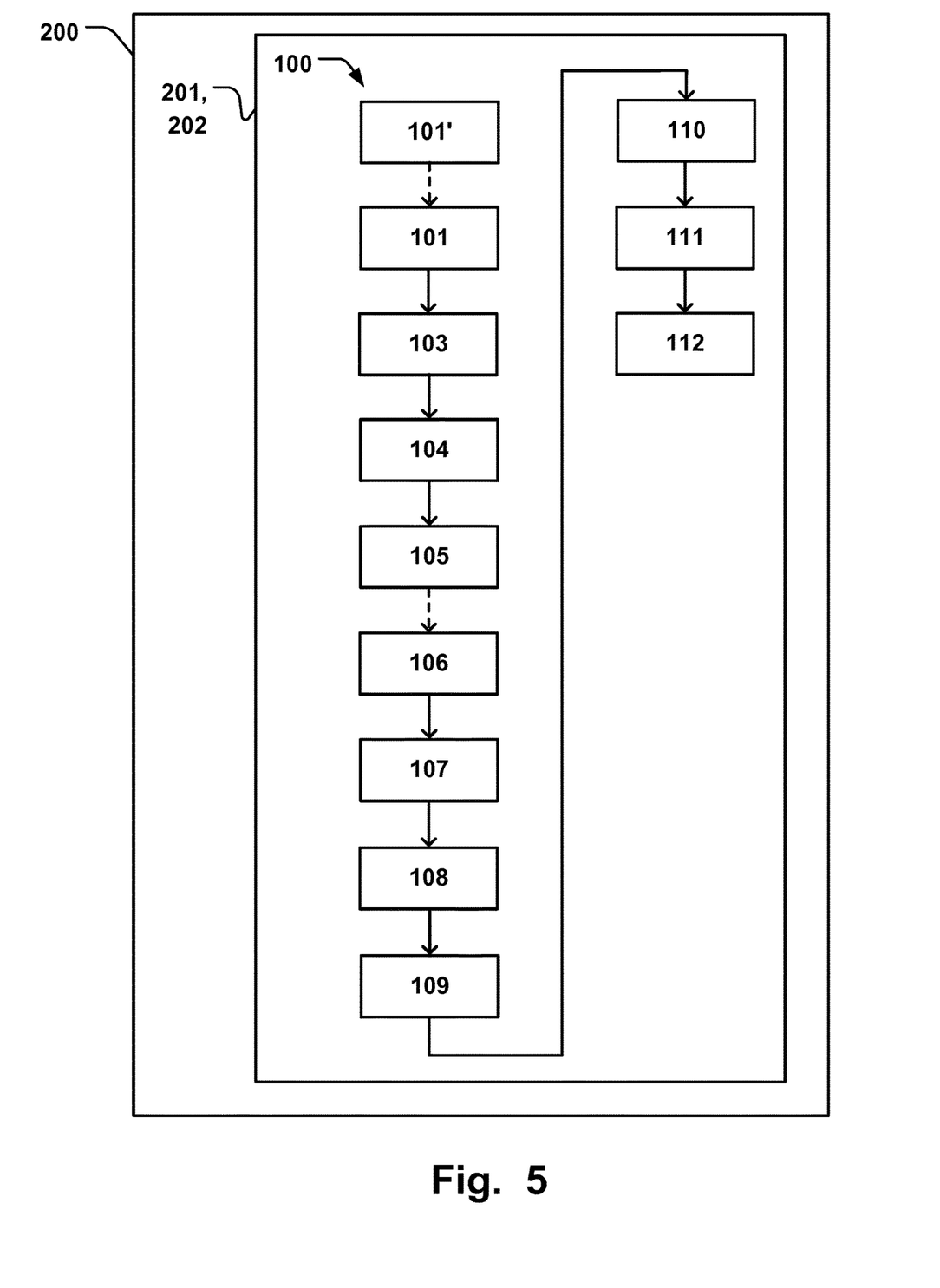
FIG. 5 is a schematic illustration of an apparatus configured to log process data in a PLC controlled equipment running PLC application code and an associated method according to examples of the disclosure.

FIG. 4b illustrates a further flow chart of a method 100 of logging process data in a PLC controlled equipment running PLC application code. The order in which the steps of the method 100 are described and illustrated should not be construed as limiting and it is conceivable that the steps can be performed in varying order. The method 100 may comprise determining 106 a logging event for the process data in dependence of a log condition $L_1$, $L_2$. The log condition $L_1$, $L_2$, comprises at least one logical operator or threshold of one or more process values $V_n$ being received from the PLC application code. The process values $V_n$ are effectively obtained from the tags stored in the data table $DT_1$, $DT_2$. The method 100 comprises receiving 107, for a logging event, at least part of the process data from the data table $DT_1$, $DT_2$. Thus, once the log condition is fulfilled, a logging event occurs, and process data, such as tag- and process values can be stored, for example on a dedicated log memory 203 schematically illustrated in FIG. 1. Determining 106 a logging event for the process data in dependence of a log condition $L_1$, $L_2$, provides for an efficient condition based logging, by being able to fully configure logging triggers (when to log data). When a log condition $L_1$, $L_2$, is not fulfilled the process data in the data table $DT_1$, $DT_2$, will not be saved to the memory 203 during the callback of the processing or communication module 201. The associated thread $TRD_1$, $TRD_2$, will remain active and connected through the communication module 201 the PLC until a new callback will arrive and inserts new process data to the $DT_1$, $DT_2$, for validation by the log condition $L_1$, $L_2$. For each data entry received from the PLC application code, the method 100 may comprise comparing 108 the received process values $V_n$ of the respective tags, associated with the data entry, with the log condition $L_1$, $L_2$, to determine 109 if the data entry is to be received for a logging event, i.e. stored in memory 203.

Figure 3:
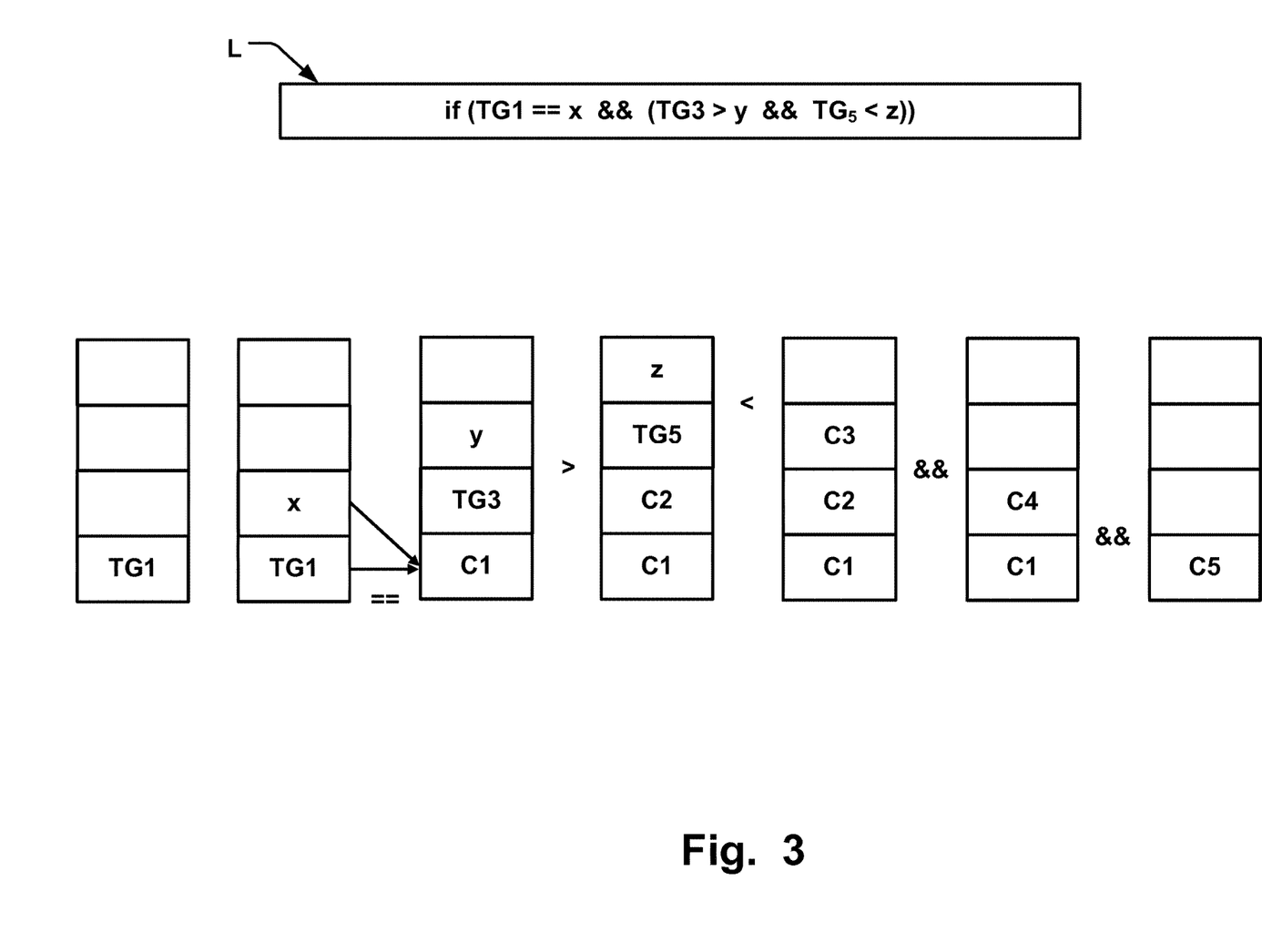
FIG. 3 is a schematic diagram illustrating applying push or pull operators to a stack of process data according to examples of the disclosure.

Having arranged the tag values and the associated process values in the respective data tables according to the hash code, as described above and exemplified in FIG. 2 provides for an efficient evaluation of the determined log conditions $L_1$, $L_2$. For example, when searching amongst tag values $TG_n$ positioned under the same hash code $HC_m$, all other tags stored in the other hash code positions will be excluded from the search. This allows the condition based logging to operate in real-time at high speeds such as with logging of process data in the range of every 1-10 ms, and in parallel for all of the tasks $T_1$, $T_2$ and associated data tables $DT_1$, $DT_2$. A faster and more stable logging of process data in a PLC systems is thus provided. FIG. 3 illustrates an example where a log condition L is evaluated with logical operators in a stacked register structure, described further below, which is particularly beneficial when having arranged the tag values and the associated process values in the respective data tables according to mentioned hash code $HC_m$.

The second processing unit 202 of the apparatus 100 may thus be configured to determine 106 a logging event for the process data in dependence of a log condition $L_1$, $L_2$, comprising at least one logical operator or threshold of one or more process values being received from the PLC application code, and configured to receive 107, for a logging event, at least part of the process data from the data table $DT_1$, $DT_2$.

The method 100 may comprise determining 110 the logging event for the process data in dependence of a log condition $L_1$, $L_2$, for each of the threads $TRD_1$, $TRD_2$. This is schematically illustrated in FIG. 1, where log condition $L_1$ is associated with the first thread $TRD_1$ and the respective data table $DT_1$, and vice versa for log condition $L_2$.

Turning again to the schematic illustration of FIG. 3, the method 100 may comprise applying 111 push and/or pull operators to a stack of process data received from the PLC application code for evaluating the log condition $L_1$, $L_2$. In the example shown, the log condition L is evaluated with logical operators and threshold values of process values $V_n$ given as "x", "y", and "z". The data stack is evaluated from left to right, where the tag values, e.g. $TG_1$, and process values, e.g. "x", are input, followed by the logical operator, e.g. "==", to arrive at an evaluated condition, e.g. "C1". The following tag-, process values, and operators are applied subsequently to the stack, arriving at final evaluated condition ("C5" in this example). Executing logical operations of the log condition $L_1$, $L_2$, by applying such operators to the stack of process data provides for reducing the complexity in carrying out the evaluation of the conditions, which speeds up the evaluation step. Conditional logging of process data can thus be carried out at the desired rate at which the PLC equipment communicates the data.

The method 100 may comprise determining 104 the hash function HF for the data table $DT_1$, $DT_2$, based on the tag- and process values $TG_n$, $V_n$. The mentioned values may thus be arranged in the respective data table $DT_1$, $DT_2$, according to an optimized hash function HF taking into account the characteristics of the tags such as the tag- and process values $TG_n$, $V_n$. The hash function HF may thus be optimized or selected based on the information about the tag- and process values $TG_n$, $V_n$, communicated from the processing module 201 when establishing connection with the PLC equipment for communication the process values. Optimized choice of hash function HF provides for reducing the look-up time and increasing the speed by which a condition based logging can be executed.

The method 100 may comprise determining 104 the hash function HF for the data table $DT_1$, $DT_2$, based on a data type of the tag- and process values $TG_n$, $V_n$, e.g. Boolean, Integer, Real number etc. This provides for further optimization and selection of the hash function HF, so that the tags and the associated hash codes $HC_m$ are arranged in the respective data tables $DT_1$, $DT_2$, optimized to the data type.

Also, the method 100 may comprise determining 104 the hash function HF for the data table $DT_1$, $DT_2$, based on the number of tags $TG_n$. This may advantageously avoid the need for subsequent re-sizing of the data structure, since the amount of tags is known already from the initial call back connection of the processing module 201 to the PLC equipment. Faster and more stable logging can thus be achieved.

The method 100 may comprise applying 112 a method of chaining to the hash function HF for a multiple of tags $TG_n$ assigned to the same hash code $HC_m$. FIG. 3 illustrates an example where tag values $TG_2$ and $TG_4$ are assigned to the same hash code $HC_2$. Both tag values are stored in the same "bucket" in the array to avoid collision. The hash collision is resolved by chaining with a head record in this bucket.

The first task $T_1$ may be associated with a communication protocol different from that of the second task $T_2$. The method 100 may comprise encapsulating 101' protocol specific attributes of respective communication protocols of the first and second task $T_1$, $T_2$, so that process data received therefrom is received in parallel independent of the protocol specific attributes. Thus, the first processing unit 201 may be configured to encapsulate 101' protocol specific attributes of respective communication protocols of the first and second task so that process data received therefrom is received in parallel independent of the protocol specific attributes. This provides for logging the process data without being hindered by different protocol communication standards, and thereby facilitating the logging at desired speed.

The first task $T_1$ may have an execution rate in the range of 1-10 ms, and the second task $T_2$ may have an execution rate in the range of 100-1000 ms. The method provides for simultaneous logging of the first and second tasks $T_1$, $T_2$, and a varying number of different tasks, having different execution rates, may further be logged.

A computer program product is provided comprising instructions which, when the program is executed by a computer, cause the computer to carry out the steps of the method 100 as described above in relation to FIGS. 1-5.

As schematically illustrated in FIG. 4b, in conjunction with FIG. 1, an apparatus 200 configured to log process data in a PLC controlled equipment running PLC application code is also provided. As mentioned, sections of the PLC application code comprise tasks $T_1$, $T_2$, configured to execute program functions at specific execution rates, wherein a first task $T_1$ has an associated execution rate different from a second execution rate of a second task $T_2$ in the PLC application code. Each of the tasks comprise program functions having dedicated memory areas assigned as tags. Each data entry of the process data comprises a tag value $TG_1$, . . . $TG_n$, and an associated process value $V_1$, . . . $V_n$, assigned from the PLC application code. The apparatus 200 comprises a first processing module 201 configured to receive 101 process data from the PLC application code. The apparatus 200 further comprises a second processing module 202 configured to assign 102 process values associated with the first $T_1$ task to threads $TRD_1$, $TRD_2$, of a thread pool in parallel with the respective assigning of process values associated with said second task to threads $TRD_1$, $TRD_2$, of the thread pool. The second processing module 202 is configured to receive 103, for each of the threads, $TRD_1$, $TRD_2$, in a respective data table $DT_1$, $DT_2$, associated with each of the threads $TRD_1$, $TRD_2$, the tag- and process values $TG_n$, $V_n$, of the received process data. The second processing module 202 is further configured to determine 104 a hash code $HC_1$, $HC_m$, for each of the tag values $TG_n$ according to a hash function HF of the respective data table $DT_1$, $DT_2$, to arrange 105 the tag values $TG_n$ and the associated process values $V_n$ in the respective data table according to said hash code $HC_m$. The apparatus 200 thus provides for the advantageous benefits as described above in relation to the method 100 and FIGS. 1-5.

The present invention has been described above with reference to specific examples. However, other examples than the above described are equally possible within the scope of the invention. The different features and steps of the invention may be combined in other combinations than those described. The scope of the invention is only limited by the appended patent claims.

More generally, those skilled in the art will readily appreciate that all parameters, dimensions, materials, and configurations described herein are meant to be exemplary and that the actual parameters, dimensions, materials, and/or configurations will depend upon the specific application or applications for which the teachings of the present invention is/are used.

The invention claimed is:

1. A method of logging process data in a programmable logic controller (PLC) controlled equipment running PLC application code,
    wherein sections of the PLC application code comprise tasks configured to execute program functions at specific execution rates, wherein a first task has an associated execution rate different from a second execution rate of a second task in the PLC application code,
    whereby each of said tasks comprises program functions having dedicated memory areas assigned as tags,
    wherein each data entry of said process data comprises a tag value and an associated process value assigned from the PLC application code,
    the method comprising:
        receiving process data from the PLC application code, whereby process values associated with said first task are assigned to threads of a thread pool in parallel with the respective assigning of process values associated with said second task to threads of the thread pool,
        receiving, for each of the threads, in a respective data table associated with each of the threads, the tag and process values of the received process data,
        determining a hash code for each of the tags according to a hash function of the respective data table, and
        arranging tag values and the associated process values in the respective data table according to said hash code.

2. The method according to claim 1, further comprising determining a logging event for the process data in dependence of a log condition comprising at least one logical operator or threshold of one or more process values being received from the PLC application code, and receiving, for a logging event, at least part of the process data from the data table.

3. The method according to claim 2, further comprising:
for each data entry received from the PLC application code,
comparing the received process values of the respective tags, associated with the data entry, with the log condition to determine if the data entry is to be received for a logging event.

4. The method according to claim 2, further comprising:
determining the logging event for the process data in dependence of a log condition for each of said threads.

5. The method according to claim 2, further comprising:
applying push and/or pull operators to a stack of process data received from the PLC application code for evaluating the log condition.

6. The method of according to claim 5, further comprising applying the tags, process values and the at least one logical operator sequentially to the stack of process data for evaluating the log condition.

7. The method according to claim 1, further comprising:
determining the hash function for the data table based on the tag and process values.

8. The method according to claim 7, further comprising:
determining the hash function for the data table based on a data type of the tag and process values.

9. The method according to claim 1, further comprising:
determining the hash function for the data table based on the number of tags.

10. The method according to claim 1, further comprising:
applying a method of chaining to the hash function for a multiple of tags assigned to the same hash code.

11. The method according to claim 1, wherein the first task is associated with a communication protocol different from that of the second task, the method further comprising:
encapsulating protocol specific attributes of respective communication protocols of the first and second task so that process data received therefrom is received in parallel independent of the protocol specific attributes.

12. The method according to claim 1, wherein the first task has an execution rate in the range of 1 to 10 ms, and the second task has an execution rate in the range of 100 to 1000 ms.

13. A computer program product comprising instructions which, when executed by a computer, cause the computer to carry out the method according to claim 1.

14. The method of according to claim 1, further comprising searching tag values positioned under a hash code while excluding all other tags stored under the other hash codes.

15. An apparatus configured to log process data in a programmable logic controller (PLC) controlled equipment running PLC application code,
wherein sections of the PLC application code comprise tasks configured to execute program functions at specific execution rates, wherein a first task has an associated execution rate different from a second execution rate of a second task in the PLC application code,
whereby each of said tasks comprise program functions having dedicated memory areas assigned as tags,
wherein each data entry of said process data comprises a tag value and an associated process value assigned from the PLC application code,
wherein the apparatus comprises one or more processors configured to:
receive process data from the PLC application code,
assign process values associated with said first task to threads of a thread pool in parallel with the respective assigning of process values associated with said second task to threads of the thread pool,
receive, for each of the threads, in a respective data table associated with each of the threads, the tag and process values of the received process data,
determine a hash code for each of tag values according to a hash function of the respective data table, and
arrange the tag values and the associated process values in the respective data table according to said hash code.

16. The apparatus according to claim 15, wherein the one or more processors are configured to determine a logging event for the process data in dependence of a log condition comprising at least one logical operator or threshold of one or more process values being received from the PLC application code, and receive, for a logging event, at least part of the process data from the data table.

17. The apparatus according to claim 16, wherein the one or more processors are further configured to:
apply push and/or pull operators to a stack of process data received from the PLC application code for evaluating the log condition, and
apply the tags, process values and at least one logical operator sequentially to the stack of process data for evaluating the log condition.

18. The apparatus according to claim 15, wherein the first task is associated with a communication protocol different from that of the second task, and wherein the one or more processors are further configured to:
encapsulate protocol specific attributes of respective communication protocols of the first and second task so that process data received therefrom is received in parallel independent of the protocol specific attributes.

19. The apparatus according to claim 15, wherein the one or more processors comprise:
a first processor configured to receive the process data from the PLC application code, and
a second processor configured to assign the process values, receive, for each of the threads, in the respective data table associated with each of the threads, the tag and process values and determine the hash code for each of the tag values.

20. The apparatus according to claim 15, wherein the one or more processors are further configured to search tag values positioned under a hash code while excluding all other tags stored under the other hash codes.

* * * * *

UNITED STATES PATENT AND TRADEMARK OFFICE
CERTIFICATE OF CORRECTION

| | | |
|---|---|---|
| PATENT NO. | : 11,086,782 B2 | Page 1 of 1 |
| APPLICATION NO. | : 16/621029 | |
| DATED | : August 10, 2021 | |
| INVENTOR(S) | : Lukas Karlsson et al. | |

It is certified that error appears in the above-identified patent and that said Letters Patent is hereby corrected as shown below:

In the Specification

In Column 5, Line 67, delete "the PLC" and insert --to the PLC--.

In the Claims

In Column 9, Line 17, Claim 6, delete "method of" and insert --method--.

In Column 9, Line 47, Claim 14, delete "method of" and insert --method--.

Signed and Sealed this
Eighteenth Day of January, 2022

Drew Hirshfeld
*Performing the Functions and Duties of the
Under Secretary of Commerce for Intellectual Property and
Director of the United States Patent and Trademark Office*